(12) United States Patent
Griffin et al.

(10) Patent No.: US 8,055,450 B2
(45) Date of Patent: Nov. 8, 2011

(54) METHOD AND APPARATUS FOR TEMPERATURE CONTROL

(75) Inventors: Michael Griffin, Brighton, MA (US); Corey Lusher, Worcester, MA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 364 days.

(21) Appl. No.: 11/437,855

(22) Filed: May 18, 2006

(65) Prior Publication Data

US 2007/0271042 A1    Nov. 22, 2007

(51) Int. Cl.
*G01N 33/48* (2006.01)
*G01N 31/00* (2006.01)
*C12Q 1/00* (2006.01)

(52) U.S. Cl. .................. 702/19; 702/22; 435/4

(58) Field of Classification Search ................ None
See application file for complete search history.

(56) References Cited

U.S. PATENT DOCUMENTS

| | | | | |
|---|---|---|---|---|
| 5,432,321 | A * | 7/1995 | Gerl | 219/492 |
| 5,475,610 | A | 12/1995 | Atwood et al. | |
| 5,854,468 | A * | 12/1998 | Muka | 219/444.1 |
| 6,962,821 | B2 | 11/2005 | Danssaert et al. | |
| 2005/0002435 | A1 * | 1/2005 | Hashimoto et al. | 374/43 |

FOREIGN PATENT DOCUMENTS

WO  WO 01/08800 A1 * 2/2001

OTHER PUBLICATIONS

Van Geet AL. Calibration of the methanol and glycol Nuclear Magnetic Resonance thermometers with a static thermistor probe. Analytical Chemistry, 1968, vol. 40, pp. 2227-2229.*
Nicholls et al. Temperature calibration of a high-resolution magic-angle spinning NMR probe for analysis of tissue samples. Magnetic Resonance in Chemistry, 2001, vol. 39, pp. 773-776.*
The NMR Chemical Shift. Accessed online on Sep. 26, 2008 from << bouman.chem.georgetown.edu/nmr/interaction/chemshf.htm >>.*
Gyugyi et al. Convex optimization of wafer temperature trajectories for rapid thermal processing. 1993, Second IEEE Conference on Control Applications, pp. 409-414.*
O'Sullivan CT. Newton's law of cooling—A critical assessment. American Journal of Physics. 1990, vol. 58, pp. 956-960.*
Tester et al. Thermodynamics and its Applications, 3rd edition. New Jersey: Prentice Hall, 1996, p. 13.*
Molnar GW. Newton's thermometer: A model for testing Newton's law of cooling. The Physiologist, vol. 12, 1969, pp. 9-20.*

* cited by examiner

*Primary Examiner* — Russell S Negin
(74) *Attorney, Agent, or Firm* — Kilpatrick Townsend & Stockton LLP (57) ABSTRACT

A method is disclosed. The method includes determining an amount of energy needed to change a first sample temperature of a first sample to a target temperature when a temperature changing element that changes the sample temperature is at the target temperature. Data associated with the amount of energy needed to change the sample temperature of the sample to the target temperature is then stored. The stored data may thereafter be used to quickly change a second sample temperature of a second sample to the target temperature, without having the second sample temperature exceed the target temperature.

28 Claims, 7 Drawing Sheets

METHOD AND APPARATUS FOR TEMPERATURE CONTROL

CROSS-REFERENCES TO RELATED APPLICATIONS

Not Applicable

BACKGROUND OF THE INVENTION

Some processes that have multiple reaction steps require careful temperature control to produce optimal results. Examples of such processes include nucleic acid amplification reactions such as the polymerase chain reaction (PCR) and the ligase chain reaction (LCR).

Apparatuses have been developed which accurately control the temperature of reaction vessels that house amplification reactions. For example, thermal cyclers are used for DNA amplification and sequencing, and other applications. A conventional thermal cycler has a block, which holds a reaction mixture, or sample, and the temperature of the block varies over time. The temperature of the sample is monitored and a feedback signal is sent to a temperature controller to control the temperature of the block.

While conventional thermal cyclers are useful, a number of improvements could be made. For example, conventional thermal cyclers do not heat the samples in the most efficient way. When a thermal cycler is used to heat and cool a sample in a PCR reaction, it is desirable to heat and cool the sample as efficiently as possible to reduce the processing time and increase throughput. Also, a conventional thermal cycler uses a feedback loop to control the temperature of the sample. The temperature of the sample is sensed by a sensor, the temperature of the sample is calculated by the processor, and a signal is fed back to a controller which controls a heating element, which supplies heat to the block. The electronics and software that are used to provide the temperature feedback loop are often complex and increase the cost of the thermal cycler.

It would be desirable to provide for an improved apparatuses and methods for changing the temperatures of samples such as PCR reaction mixtures. Embodiments of the invention address these and other problems, individually and collectively.

SUMMARY OF THE INVENTION

Embodiments of the invention are directed to methods, systems, and computer readable media for changing the temperature of a block. The block may be a heating/cooling block in a thermal cycler.

One embodiment of the invention is directed to a method, where the method comprises determining an amount of energy needed to change a sample temperature of a sample to a target temperature when a temperature changing element (e.g., a heating element) that changes the sample temperature is at the target temperature. Data associated with the amount of energy needed to change the sample temperature of the sample to the target temperature is then stored in memory. The stored data can then be used by a processor to change a second sample temperature of a second sample to the target temperature in an optimal manner, without exceeding the target temperature.

Another embodiment of the invention is directed to a computer readable medium comprising: code for determining an amount of energy needed to change a sample temperature of a sample to a target temperature when the temperature changing element that changes the sample temperature of the sample is at the target temperature; and code for storing data associated with the amount of energy needed to change the sample temperature of the sample to the target temperature.

Another embodiment of the invention is directed to a method comprising: retrieving stored data associated with an amount of energy needed to change a first sample temperature of a first sample to a target temperature when a temperature changing element is at the target temperature and is changing the first sample temperature; and changing the temperature of the temperature changing element using the data associated with the amount of energy. The temperature changing element is adapted to change the temperature of a second sample to the target temperature.

Another embodiment of the invention is directed to a computer readable medium comprising: code for retrieving the stored data associated with an amount of energy needed to change a first sample temperature of a first sample to a target temperature when a temperature changing element is at the target temperature and is changing the first sample temperature; and code for changing the temperature of the temperature changing element using the data associated with the amount of energy, wherein the temperature changing element is adapted to change the temperature of a second sample to the target temperature.

Another embodiment of the invention is directed to a method comprising: determining an overshoot temperature for a temperature changing element to change a sample temperature of a sample to a target temperature; causing the temperature changing element to be at the overshoot temperature for a predetermined amount of time; and changing the temperature of the sample so that the temperature of the sample reaches the target temperature without overshooting the target temperature. Other embodiments of the invention are directed to computer readable media comprising code for performing the method.

Yet other embodiments of the invention are directed to apparatuses that are adapted to perform such methods and/or are use such computer readable media. Exemplary apparatuses may include thermal cyclers.

These and other embodiments of the invention are described in further detail below.

DETAILED DESCRIPTION

Embodiments of the invention include methods for quickly and efficiently changing the temperatures of samples to predetermined target temperatures. Embodiments of the invention also include apparatuses (e.g., thermal cyclers) and computer readable media suitable for performing such methods.

In one embodiment of the invention, a sample such as a PCR reaction mixture may be heated to a target temperature using a thermal cycler. The thermal cycler has a heating block which is adapted to heat the sample.

In a first step, a process for heating the sample using the heating block can be created, and an apparatus using the heating block can be characterized. The characterization can include determining the amount of thermal energy needed to raise the temperature of the sample to a target temperature associated with the temperature of the block, determining the ideal rate of sample temperature rise to the target temperature, calculating the amount of energy that is to be applied to subsequent samples as a thermal overshoot of the target temperature, and converting the calculated amount of energy into a specific temperature and duration of overshoot, given the block ramp rate at which said overshoot will occur.

As used herein, an "amount of energy" or the like is intended to be construed broadly, and can encompass indirect measures of energy. For example, indirect measures of energy may relate to and/or include a heating temperature(s) (or cooling temperature) and the duration of heating (or cooling). For example, the temperature of a heating block and the time at that temperature may constitute an indirect measurement of the thermal energy that is imparted to a sample on the heating block. As shown below, this indirect measurement of energy may be represented by two-dimensional regions on a two-dimensional graph of temperature vs. time.

As used herein, "overshoot" refers to any temperature that exceeds an intended target temperature. For example, an "overshoot temperature" (e.g., 90° C.) for a sample exceeds the target temperature (e.g., 80° C.), when the term is used in the context of heating the sample. In the context of cooling a sample, the term "overshoot" temperature may refer to the temperature (e.g., 70° C.) that is below the target temperature (e.g., 80° C.).

Data associated with the amount of thermal energy needed to change the temperature of a sample to the target temperature, as well as the overshoot temperature and duration of the overshoot, are stored in memory (which may include a computer readable medium) so that the overshoot temperature and duration can be used for other, subsequently processed samples.

Once the sample is characterized for the particular thermal cycler and/or block that is associated with the thermal cycler, the thermal cycler can be used to optimally and efficiently heat or cool subsequent second, third, etc. samples that are similar to the characterized first sample. A processor retrieves the data associated with the determined amount of thermal energy from memory, including an overshoot temperature and overshoot duration, and then uses the data to cause the heating block to deliver the previously determined amount of energy to subsequently processed samples. The overshoot duration may be for a predetermined amount of time (e.g., 1 ms). As a result of utilizing this stored data, the temperatures of the subsequent samples rise to the target temperature in the shortest time possible, without overshooting the target temperature. For example, a sample temperature may rise from an initial temperature 25° C. to a target temperature of 75° C. at the fastest rate possible, without overshooting the target temperature. In preferred embodiments, the change in temperature of the subsequent samples follows an ideal response plot corresponding to an optimal temperature change from an initial sample temperature to the target temperature so that little energy is wasted and processing can occur as efficiently as possible.

Embodiments of the invention have a number of advantages. In embodiments of the invention, the temperature of a sample can be raised or lowered by heating or cooling the sample. This can be done without the need to rely on an adaptive calculation of current (real-time) sample temperature based on a current (real-time) block temperature as in a conventional thermal cycler. Thus, in addition to being able to quickly and efficiently change a sample temperature to one or more desired target temperatures, a thermal cycler according to an embodiment of the invention can be less complex than conventional thermal cyclers.

Embodiments of the invention are particularly suitable for PCR processing. PCR is a well known technique that uses multiple cycles that results in the amplification of certain polynucleotide sequences each time a cycle is completed. The PCR technique typically involves the step of denaturing a polynucleotide, followed by the step of annealing at least a pair of primer oligonucleotides to the denatured polynucleotide, i.e., hybridizing the primer to the denatured polynucleotide template. After the annealing step, an enzyme with polymerase activity catalyzes synthesis of a new polynucleotide strand that incorporates the primer oligonucleotide and uses the original denatured polynucleotide as a synthesis template. This series of steps (denaturation, primer annealing, and primer extension) constitutes a PCR cycle. As cycles are repeated, the amount of newly synthesized polynucleotide increases geometrically because the newly synthesized polynucleotides from an earlier cycle can serve as templates for synthesis in subsequent cycles. Primer oligonucleotides are typically selected in pairs that can anneal to opposite strands of a given double-stranded polynucleotide sequence so that the region between the two annealing sites is amplified.

The temperature of the reaction mixture is varied during a PCR cycle, and consequently varied many times during a multicycle PCR experiment. For example, denaturation of DNA typically takes place at around 90-95° C., annealing a primer to the denatured DNA is typically performed at around 40-60° C., and the step of extending the annealed primers with a polymerase is typically performed at around 70-75° C.

In PCR processing, it is desirable to heat the PCR sample to the exact target temperature, as quickly and efficiently as possible. For example, while the temperature at which DNA denatures is generally between 90-95° C., slight variations in the particular temperature are observed depending on the length of the DNA and the percentage of each of the four deoxynucleotides present (guanine-cytosine pairs and adenine-thymine pairs). Insufficient heating during the denaturation step is a common reason for a PCR reaction to fail. However, overheating during the denaturation step can result in excessive denaturation of the polymerase. Also, an annealing temperature which is too low will result in non-specific DNA fragments being amplified. At too high of an annealing temperature, the primers will anneal less efficiently resulting in decreased yield of the desired product and possibly reduced purity.

Achieving the optimal temperature for the extension reaction is also important for obtaining the desired PCR result. Temperature may affect both the rate and the accuracy of the extension reaction. If the rate of the polymerase reaction is too low, then the newly synthesized polynucleotide may not contain a site for primer annealing. Additionally, the denatured polynucleotide sequence for amplification may contain one or more regions of secondary structure that may form or disappear according to the temperature selected. Furthermore, several different enzymes with polymerase activity may be used for PCR. Each enzyme will have its own optimum temperature for activity, stability and accuracy.

Figure 1:
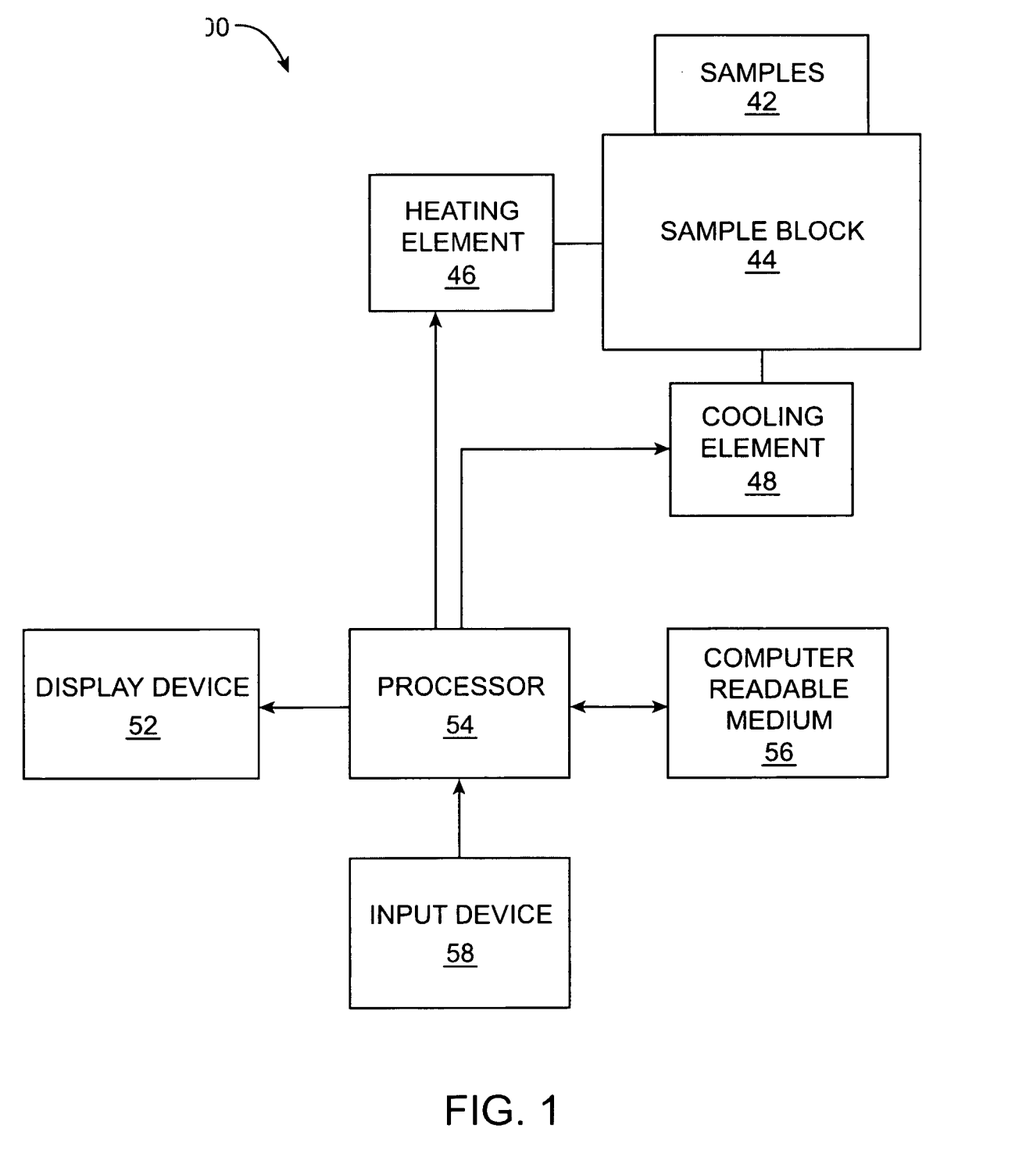
FIG. 1 shows a block diagram of a system according to an embodiment of the invention.

FIG. 1 shows an apparatus 100 according to an embodiment of the invention. The apparatus 100 includes one or more samples 42 in one or more containers (e.g., glass or plastic tubes) that are supported by a sample block 44.

As used herein, "samples" can include any suitable type of material that can be heated or cooled. In embodiments of the invention, the samples preferably include a biological material such as DNA or RNA. For example, in some embodiments, the samples include reaction mixtures at various stages in a PCR process.

The sample block 44 may comprise any suitable material and may be in any suitable form. For example, the sample block 44 may be a block comprising a thermally conductive metal such as aluminum. The block 44 may have sample wells for holding samples. It may also have a number of passages for cooling elements and/or heating elements. The passages may contain wires, heat transfer fluids, etc.

The apparatus 100 also includes a heating element 46 adapted to heat the sample block 44, as well as a cooling element 48 adapted to cool the sample block 44. Suitable heating and cooling elements are commercially available.

The heating element 46 may comprise any suitable device that can cause the temperature of the sample block 44 to rise. Exemplary heating elements include resistive heaters, heated fluids and corresponding pumps, etc.

The cooling element 48 may comprise any suitable device that can cause the temperature of the sample block 44 to fall. Exemplary cooling elements include a cooling fluid with an associated pump to pump the cooling fluid through the sample block 44.

The block 44, alone or in combination with the heating element 46 and/or the cooling element 48, may constitute a temperature changing element. In embodiments of the invention, a temperature changing element may include any structure or combination of structures that is/are adapted to change the temperature of the samples 42.

A processor 54 may be operatively coupled to the heating element 46 and/or cooling element 48 and may be used to control them so that they provide predetermined amounts of thermal energy to the samples 42. The processor 54 may be embodied by a commercially available microprocessor in a commercially available computational apparatus.

The processor 54 also reads instructions from and can store data to a computer readable medium 56 in operative communication with the processor 54. The computer readable medium 56 may store data using any suitable electrical, optical, and magnetic data storage mechanism, and may be volatile and/or non-volatile in nature. The computer readable medium 56 may be embodied by one or more memory chips, and/or optical or magnetic disk drives.

Computer code for performing any of the functions and/or methods described herein may be stored on the computer readable medium 56 in the form of one or more computer programs. Such computer programs may be created using any suitable programming language including C, C++, Fortran, or the like. Those of ordinary skill in the art know other ways to program the apparatus 100 to achieve the intended functions of the apparatus 100.

Various input devices 58 such as keyboards and mice, and various output devices 52 such as displays may be coupled to the processor 54 to allow an operator to control the apparatus 100 and receive any outputs from the apparatus 100.

Other embodiments of the invention may have a different configuration than is shown in FIG. 1, and embodiments of the invention are not limited to the specific configuration shown in FIG. 1. For example, in some embodiments, the apparatus need not have a cooling element 48 and may only have a heating element 46, or vice-versa. In yet other embodiments, the heating element 46 and the cooling element 48 need not heat and cool the same block 44. For example, in other embodiments, the heating element 44 and the cooling element 48 may heat and cool the samples 42 independently, without using a common heating block 44.

Figure 2:
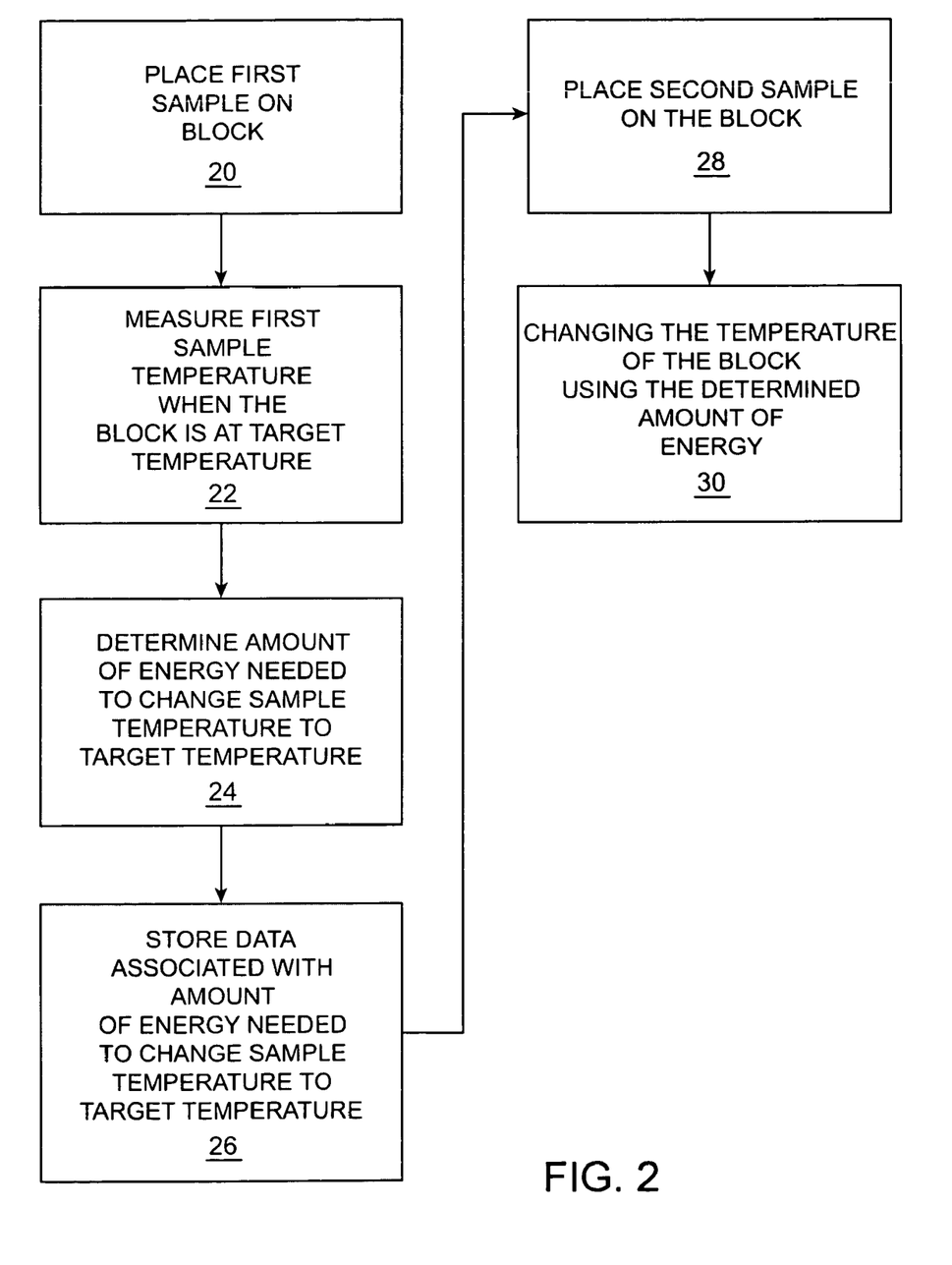
FIG. 2 shows a flowchart illustrating a method according to an embodiment of the invention.

FIG. 2 shows a general flowchart illustrating a method according to an embodiment of the invention. In a first part of the method, a particular sample with a particular volume is characterized with respect to a particular sample block. The method includes placing a first sample on the sample block 44 (step 20). The first sample may include a PCR reaction mixture. The temperature of the first sample is then measured when the block 44 is at the target temperature $T_t$ (step 22) at a particular time, $t_0$. In one example, the target temperature $T_t$ may be 80° C. and to may be 0. The time, $t_1$, that it takes for the first sample to reach the target temperature $T_t$ is then determined. An ideal sample temperature rate is then determined, and an the amount of overshoot energy is then determined (step 24). Data associated with the amount of overshoot energy is then stored on the computer readable medium 56 (step 26). The data associated with the overshoot energy can include an overshoot temperature and an overshoot duration. For example, a heating block may be heated to 10° C. above the target temperature $T_t$, and the time at which the heating block remains over the target temperature $T_t$ may be 20 seconds to optimally and efficiently heat the sample to the target temperature $T_t$.

In a second part of the method, once the overshoot energy (and the corresponding overshoot temperature and duration) is determined, the determined overshoot energy is used to efficiently and optimally heat or cool samples that are similar to the previously characterized first sample. After the data are stored on the computer readable medium 56, a second sample 42 is placed on the sample block 44 (step 28). The processor 54 reads the data associated with the amount of overshoot energy from the computer readable medium, and this amount of energy is supplied to the heating element 46 or withdrawn from the cooling element 46 to change the temperature of the sample block 44 to the appropriate target temperature (step 30). The second sample 42 is heated to the target temperature in the most efficient way, without overshooting the target temperature.

In preferred embodiments, there is no temperature feedback loop from the sample to the processor. The amount of energy that is needed to efficiently heat subsequent samples is predetermined and that amount of energy is provided to the subsequent samples to heat them to the target temperature.

I. Sample and Block Characterization

The characterization of a particular apparatus and/or sample block, with respect to a particular sample and its associated volume can be described with reference to FIGS. 3-8. First, thermal data is collected via direct measurement of the block and sample temperature. To determine the block temperature, sensors can be imbedded in the metal of the block. A temperature sensing element (e.g., a thermistor) can be placed in a tube filled with the sample of interest.

Figure 3:
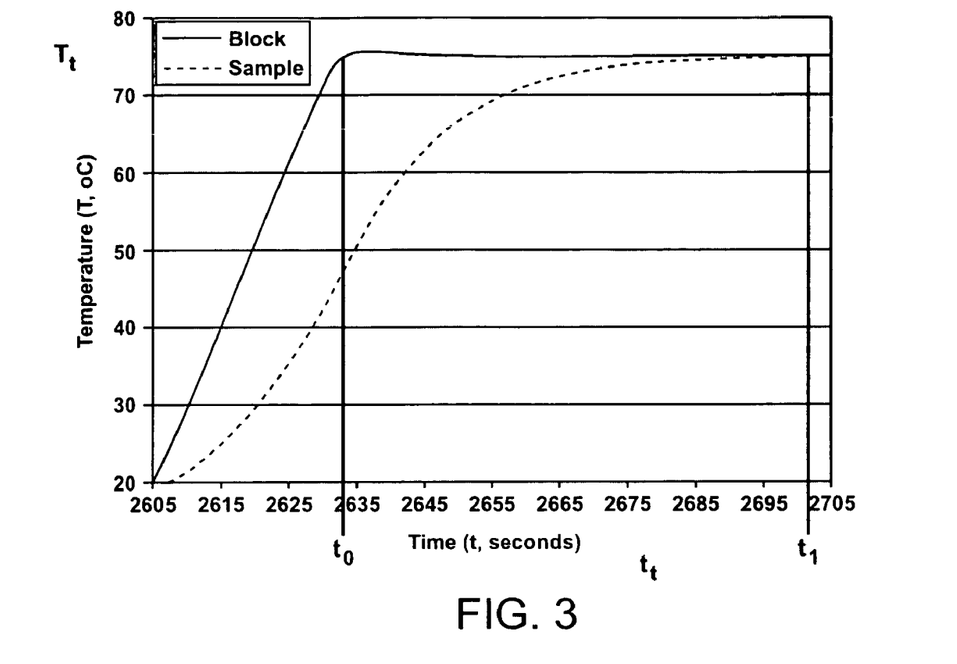
FIG. 3 shows a graph of block and sample thermal data. The temperature rise of a block and as the temperature rise of a sample are shown.

FIG. 3 shows a first curve showing the temperature rise of a block over time. The block starts out at 20° C., and rises to 75° C. at to (i.e., about 2637 seconds) where it reaches the target temperature $T_t$ and plateaus. The sample temperature starts at 20° C., and reaches about 47° C. at $t_0$. As used herein, to may refer to the time when the block first hits the target temperature $T_t$. The sample temperature then gradually rises and reaches the target temperature $T_t$ at $t_1$ (i.e., about 2705 seconds). As used herein, $t_1$ may refer to the time at which a sample reaches the target temperature $T_t$ using a block that is held at the target temperature $T_t$. The rise in the sample temperature may be referred to as an "unaided" temperature rise, because the sample is simply placed on a block programmed to heat the block to the target temperature.

Figure 4:
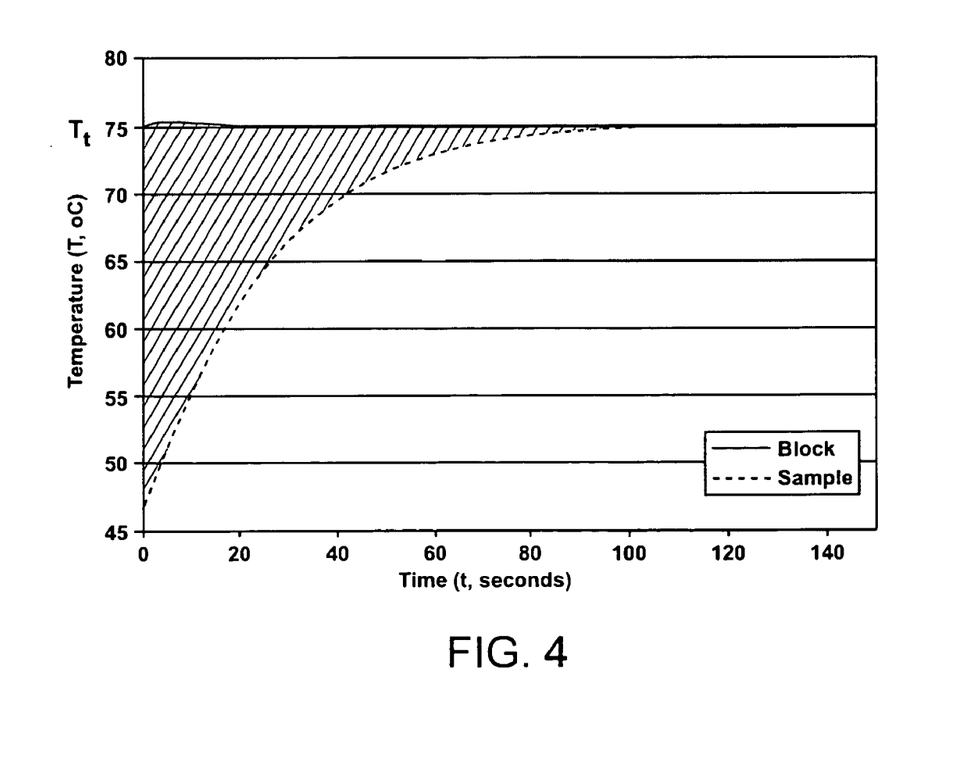
FIG. 4 shows a portion of the graph shown in FIG. 3, from the time $t_0$ the time $t_1$.

With the data in FIG. 3, it is possible to find the area of interest, which is the time domain which starts at to, where the block reaches the target temperature $T_t$, to $t_1$, where the sample temperature reaches the target temperature $T_t$. Focusing on this area, the area below the target temperature $T_t$ (and consequently the steady state block temperature), but above the sample temperature curve, is integrated. This area corresponds to an amount of thermal energy needed to raise the sample temperature to the target temperature $T_t$, which is also the block's steady state temperature. FIG. 4 shows the area between the two curves, and between $t_0$ and $t_1$. This corresponds to the thermal energy needed to heat the sample to the target temperature $T_t$.

Figure 5:
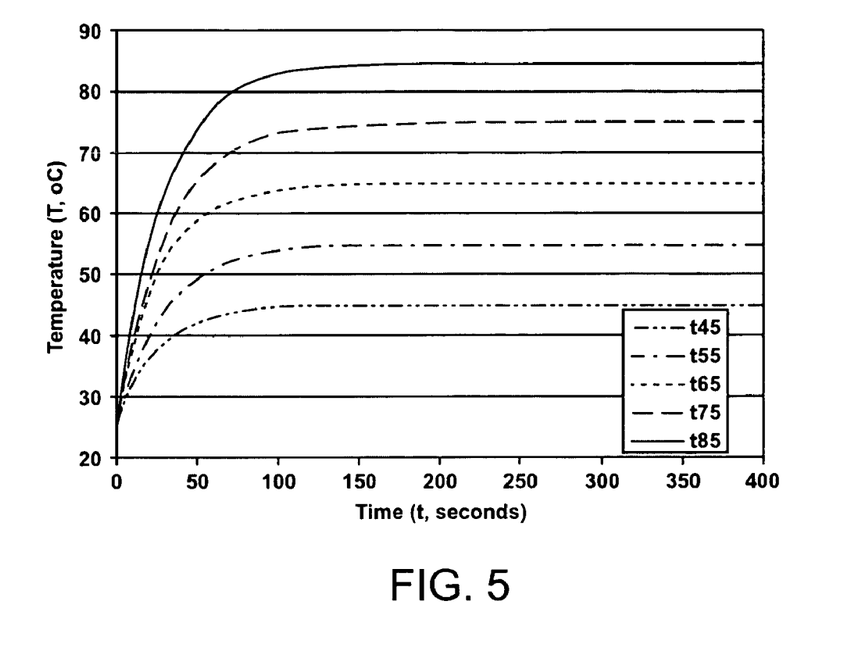
FIG. 5 shows a family of curves showing the temperature response of various samples are they are heated by sample blocks at various constant temperatures.

Referring to FIG. 5, it is assumed that some "overshoot" in the block temperature will cause the sample temperature to rise to the target temperature $T_t$ in an optimal manner, that is faster than the rise in sample temperature shown in FIG. 3 without exceeding the target temperature $T_t$. To find this ideal response, the ramp rate of the sample is characterized as a function of the delta T between the temperature of the block and the temperature of the sample. This relationship is determined by collecting data, thereby providing a family of curves that describe this relationship.

An exemplary family of curves is shown in FIG. 5. To generate the family of curves shown in FIG. 5, five samples (e.g., of water) at 25° C. are placed on the heating block at target temperatures of 45° C., 55° C., 65° C., 75° C., and 85° C. Other embodiments can use other constant block temperatures, and other samples, and/or sample volumes. The temperatures of the samples are then plotted against time and the family of curves shown in FIG. 5 is then generated.

Figure 6:
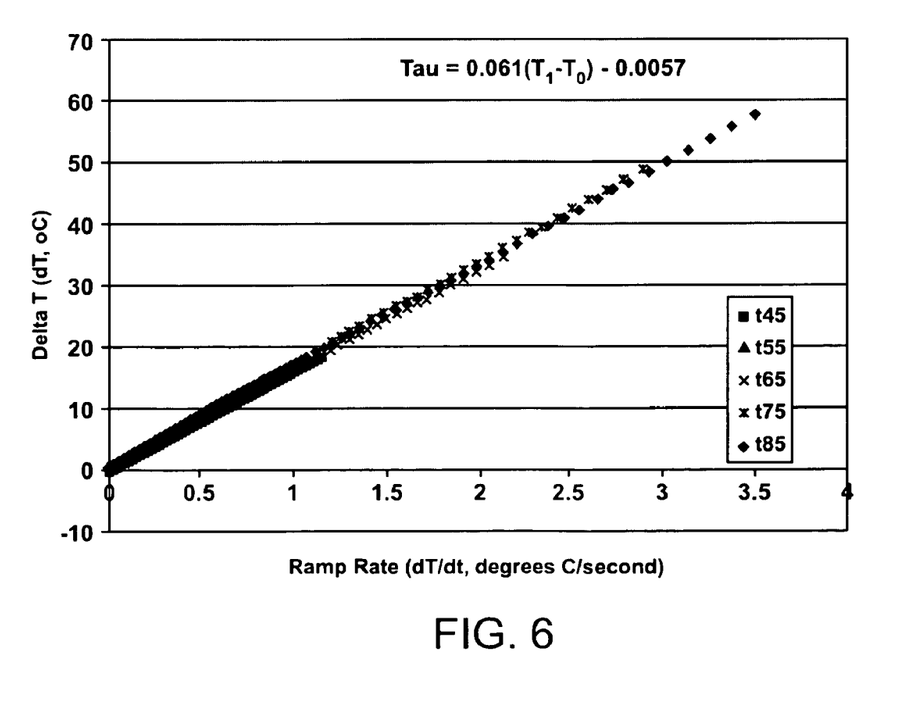
FIG. 6 shows a graph showing the relationship between delta T and ramp rate, for the various curves shown in FIG. 5.

With the curves shown in FIG. 5, it is possible to determine the optimal rise in sample temperature to the target temperature $T_t$. FIG. 6 shows a graph of delta T vs. ramp rate (dT/dt) for the various curves shown in FIG. 5. In FIG. 6, delta T vs. ramp rate (dT/dt) for each of the curves shown in FIG. 5 is plotted. FIG. 6 shows that that the change in temperature at different block temperatures vs. the ramp rate is essentially the same. In FIG. 6, calculations were made at one-half second intervals, although other intervals can be used in other embodiments of the invention. In FIG. 6, delta T is the difference between current sample temperature at each measurement and the temperature of the block and dT/dt is the instantaneous rate of change of the sample temperature. FIG. 6 shows that, whatever block temperature is used, the ramp rate of the sample being heated is about the same with respect to the difference between current sample temperature of the sample and the temperature of the block. The line shown in FIG. 6 can be characterized by the formula:

$$\tau=0.061(T_1-T_0)-0.0057 \quad (1)$$

wherein $\tau$ is equal to the ramp rate of the sample as a function of delta T. Note that equation (1) is for the given sample and that other equations may be used in other embodiments of the invention. For a given delta T, or $T_1-T_0$, $\tau$ can be determined. $\tau$ can represent the slope of a line corresponding to the ideal ramp rate for a sample to a particular target temperature.

Figure 7:
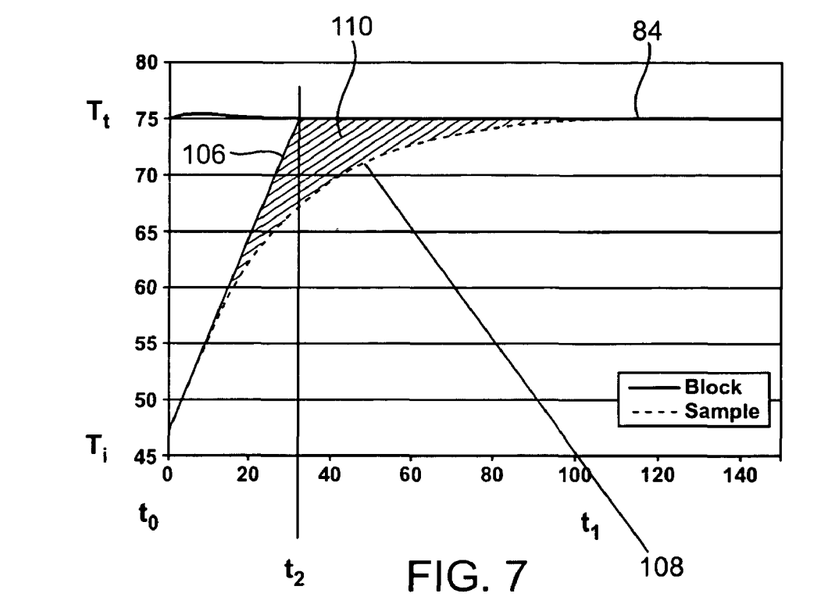
FIG. 7 shows a graph showing a first line representing the optimal rise in the temperature of a sample to a target temperature, and a second line representing a normal rise in a sample temperature to the target temperature, unaided by any thermal overshoot.

FIG. 7 shows a graph which illustrates the optimal rise in the sample temperature of a particular sample to the target temperature $T_t$ (note: the data in FIG. 7 does not necessarily correlate to the data in FIG. 6; FIG. 7 is used to graphically illustrate an example of an unaccounted for energy separating an ideal temperature ramp to the target temperature $T_1$, from an unaided temperature ramp to the target temperature $T_1$, determined by an initial temperature measurement). Line 84 corresponds to the target temperature $T_t$ as well as the steady state block temperature. Curve 108 shows the rise in the sample temperature from the time $t_0$ the time $t_1$. This graph corresponds to the area between $t_0$ and $t_1$ in the graph shown in FIG. 3. Line 106 is a line showing the optimal rise in temperature for the sample to the target temperature $T_t$, which is also the steady state block temperature shown by line 84. This line can be calculated by applying the means used to arrive at equation (1). The time where line 106 crosses the target temperature is $t_2$. $t_2$ corresponds to the fastest time in which the sample can be heated to the target temperature of 75° C. in this example. Regardless of how hot the block gets, the sample temperature will rise no faster than the path shown by line 106.

When it is assumed that the temperature of the sample will rise in this fashion, the area above line 106 and below the block temperature line 84 will remain a constant between what has been measured and what is desired, leaving the area below line 106 corresponding to the ideal sample response and above the measured sample response 108 to form area 110. This area 110 represents the unaccounted for energy separating an ideal temperature ramp to the target temperature $T_t$, from the unaided temperature ramp to the target temperature $T_1$ (determined by an initial temperature measurement). It has been determined that a block temperature overshoot of exactly this area delivered between $t_0$ and $t_2$ will affect a change in sample temperature such that the sample follows an ideally desired temperature response.

The concept of block temperature overshoot can be described with reference to FIG. 8. The area 110 shown in FIG. 7 is analogous to area $A_b$ in FIG. 8. As noted above, the area 110 represents the unaccounted for energy separating an ideal temperature ramp for a sample from an unaided temperature ramp for the sample, determined by an initial temperature measurement. If an amount of energy that is substantially equal to this amount of energy is provided to another similar sample being heated between the times $t_0$ and $t_2$, the heating of the similar sample will closely follow the ideal temperature response curve 106 in FIG. 7 and 166 in FIG. 8. Thus, a heating element can cause the block to heat so that it "overshoots" the target temperature $T_t$ between the times $t_0$ and $t_2$. The overshoot energy provided to the heating block to heat the sample can be represented by the area of the triangle $A_{os}$. By applying the thermal energy represented by $A_b$ so that it is represented by the thermal energy $A_{os}$, the thermal energy that is needed to heat the sample to the target temperature $T_t$ is input to the sample more quickly and consequently causes the sample temperature to reach the target temperature $T_t$ more quickly, without causing the sample temperature to exceed the target temperature $T_t$.

To determine the area $A_{os}$, the area $A_b$ can be determined since $A_{os}$ equals or is approximately equal to $A_b$. The area $A_b$ can be determined using the equation:

$$A_b = (T_t - 0)(t_1 - t_0) - \left[\int_0^1 f(t)\right] - \frac{((T_t - T_i)^2)}{2\tau} \quad (2)$$

In the above equation, $T_t$ is the target temperature of the block, $T_i$ is the initial temperature of the sample when the block is at the target temperature, $t_1$ is the time that it takes for the temperature of the sample to reach the target temperature using a block that has a constant temperature at the target temperature, $t_2$ is the time it takes a sample to reach target temperature in an ideal ramp, $\tau$ is the ideal ramp rate or slope of the line 166, and f(t) is a function describing the curve 168. Equation (2) is one way to derive the area $A_b$, there are other ways to derive the area for $A_b$, and hence the area for $A_{os}$.

Once the area $A_{os}$ is determined, an exemplary overshoot temperature, $T_{os}$, can then be found. The temperature of the overshoot can be equal the square root of the quantity of the block's ramp rate (R) times the overshoot area $A_{os}$, and may be represented by the following equation:

$$T_{os} = \sqrt{RA_{os}} \quad (3)$$

or by the equation $$T_{os} = 2\frac{A_{os}}{t_{os}} \quad (4)$$

In this equation, $t_{os}$ is the duration of the overshoot, or the time for which the temperature of the block is higher than the target temperature. The derivation of these equations is based on the assumption that the area forming $A_{os}$ is a isosceles triangle, and ordinary geometric calculations can be used to determine the area of the triangle and the height of the triangle to determine the overshoot temperature for the block.

Figure 8:
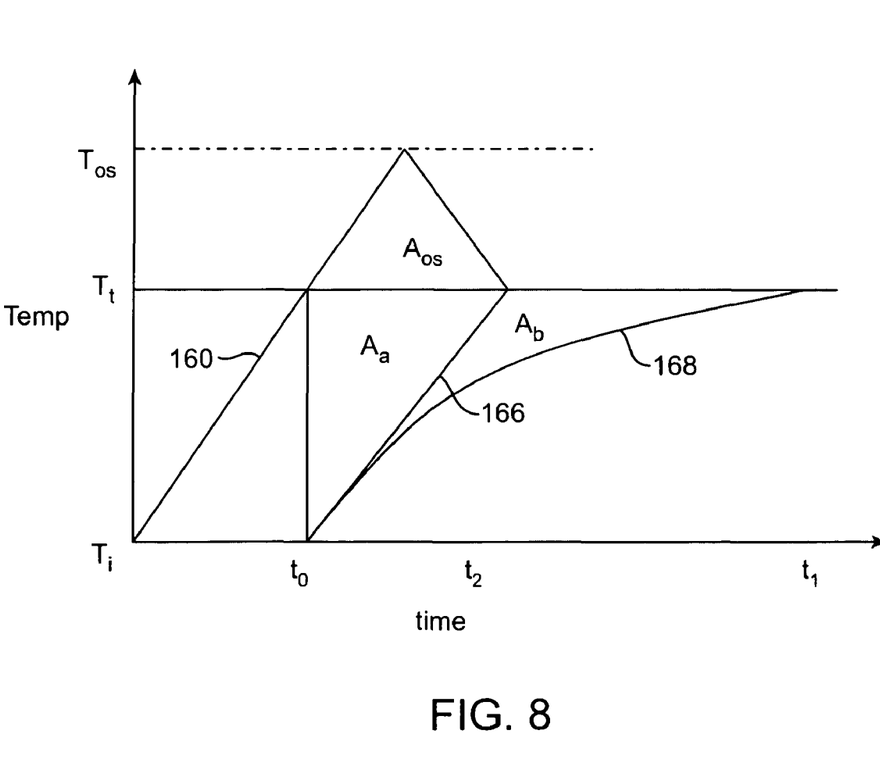
FIG. 8 shows a graph which illustrates an overshoot area and other areas in various temperature vs. time plots.

In a specific example, and referring to FIG. 8, $t_0=0$ seconds, $T_i=47.34801°$ C., $t_1=69.59$, and $T_t=75°$ C. The area bounded by the time domain $t_0$ to $t_1$ and $T_i$ to $T_x$ can be designated $A_{box}$. $A_{box}$ is equal to $A_{box}=(T_t-T_i)\cdot(t_1-t_0)$, which is equal to about 1924.302 sec·° C. in this example. $A_{box}=A1+A2$, where A2 is the integral from $t_0$ to $t_1$ of the function describing the rise in sample temperature from $T_i$ to $T_t$, which is line 168. A2=1541.654 sec·° C. and can be by found by mapping the function to f(t) and then integrating the area under the curve over the time domain $t_0$ to $t_1$. Then, $A1=A_{box}-A2=382.648$ sec·° C.

From the data in FIG. 6, the line 166 shown in FIG. 6 may be represented by the equation, $\tau=0.061(T_t-T_i)-0.0057$, so that $\tau=1.676483$. In this example, $A1=A_a+A_b$, and $A_a=228.0466$. The derivation of $A_a$ can be found as follows.

$$A_a = \frac{1}{2}bh = \frac{1}{2}b(t_2 - t_0), t_2 = t_0 + \frac{h}{\tau},$$

$$A_a = \frac{h^2}{2\tau} = \frac{(T_t - T_i)^2}{2\tau} = 228.0466 \text{ sec.}°C.$$

The area $A_b$, and consequently, the area $A_{os}$, can be found as follows:

$A_b=A1-A_a=154.6014$ sec·° C., and therefore
$A_{os}=A_b=154.6014$ sec·° C.

Once $A_{os}$ is determined, it is possible to determine $T_{os}$ and $t_{os}$ since $A_{os}$ is ideally represented by an isosceles triangle. In this example, $T_{os}=16.2118°$ C. and $t_{os}=19.0727$ seconds. Thus, to obtain the ideal sample temperature ramp to the target temperature, without exceeding target, one would heat the sample about 16.21° C. above the target temperature of 75° C. in this example. The duration of the overshoot would be about 19.07 seconds. To form the triangular overshoot area shown in FIG. 8, the heating block would be programmed to heat to 91.21° C., which it would arrive at about 9.5 seconds after the block hits the target temperature $T_t$.

An apparatus such as a thermal cycler may be programmed using conventional techniques to cause a sample block to follow the heating profile shown in FIG. 8 to cause processed samples to reach the target temperature as quickly and as efficiently as possible, without causing the sample temperature to substantially overshoot the target temperature. As noted above, in a process such as a PCR process, a reaction mixture is preferably heated to a target temperature as quickly as possible, without overshooting the target temperature. In the example shown in FIG. 8, a thermal cycler can be programmed to cause its block to heat to the overshoot temperature $T_{os}$, halfway between the times $t_0$ and $t_2$ to optimally and accurately heat a sample.

A triangular overshoot area is suitable for systems that can heat sample blocks to high temperatures. However, some apparatuses may not be able to heat a sample block to such high temperatures. For example, some heating cycles are very short (on the order of seconds) and corresponding triangular overshoot areas can be very tall. This can consequently result in very high overshoot temperatures. To address this problem, it is possible to convert the desired overshoot area, $A_{os}$, to a trapezoid. The overshoot temperature would be set by the largest allowable temperature of the apparatus, $T_{os}$ would then be the largest allowable temperature of the apparatus minus the target temperature of the block. Then, as shown below, the hold at the maximum overshoot temperature, $T_{os}$, would be the area above divided by the maximum temperature overshoot of the system, minus the maximum temperature divided by the ramp rate of the block. The trapezoidal overshoot area would have the same area as the area $A_b$ in FIG. 8. Trapezoid overshoot parameters can be characterized by the following equations:

$$t_{os} = \frac{A_{os}}{T_{os}} + \frac{T_{os}}{R} \quad (5)$$

$$t_{hold} = \frac{A_{os}}{T_{os}} - \frac{T_{os}}{R} \quad (6)$$

where $t_{os}$ is the time of the overshoot, and $t_{hold}$ is the time at which the overshoot occurs at the overshoot temperature, $T_{os}$.

Figure 9:
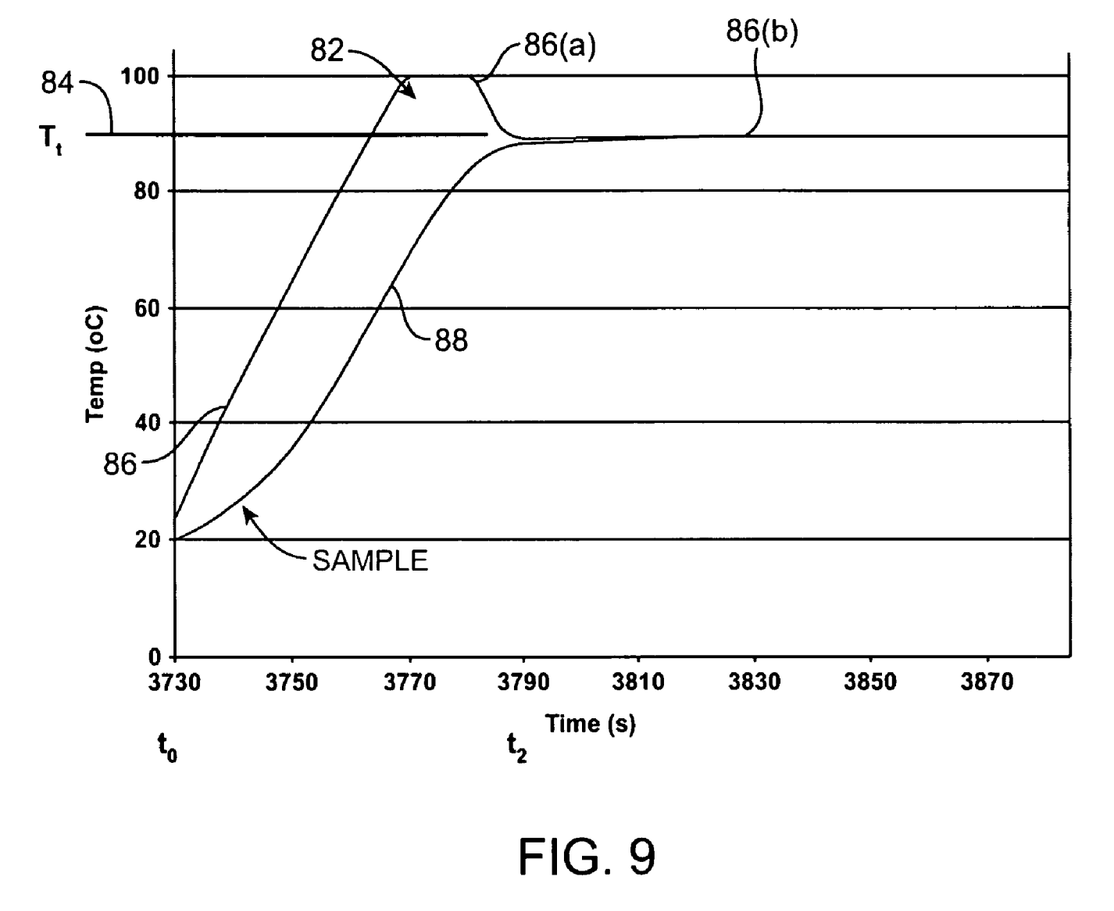
FIG. 9 shows a graph of temperature vs. time, showing one line representing the temperature of a block and another line representing the temperature of a sample, after an apparatus and/or its sample block has been characterized. A trapezoidal overshoot area is shown in FIG. 9.

A trapezoidal overshoot area 82 is shown in FIG. 9. FIG. 9 shows a graph including a block temperature curve 86, a sample temperature curve 88, and a target temperature line 84. The block temperature curve 86 and the target temperature line 84 form a trapezoidal overshoot area 82. A plateau 86(a) that describes the upper bound of the overshoot area 82 can correspond to the overshoot temperature $T_{os}$. Comparing FIG. 8 and FIG. 9, it is apparent that a lower overshoot temperature, relative to using a triangular overshoot area, can achieve the same end result of efficiently and accurately heating a sample by applying similar $A_{os}$. Other embodiments may use other means of applying a calculated $A_{os}$ which are neither triangular nor trapezoidal.

II. After Characterizing the Block and Sample

Once a sample is characterized for a particular block and/or apparatus, a table of areas can be generated for any apparatus (e.g., any thermal cycler) and that table can be used to optimally raise or lower the temperatures of any subsequently processed samples to achieve the target temperatures. Also, using this method, an equation may be used to characterize the relationship between the sample volume, target temperature, delta T, and the area such that an equation may be used instead of a lookup table. This table or equation would provide the area of any overshoot needed for that given block, and can also provide the appropriate overshoot temperature and/or duration of overshoot. All that would be needed is the calculation of an area for each transition at each volume for a particular thermal cycler. Any such equations or tables can be stored in a computer readable medium that works in conjunction with a processor to cause a heating element to supply, or a cooling element to remove, heat to a sample block.

Although the heating of samples is described in detail in this application, it is understood that the principles can equally apply to cooling. For example, a sample can be cooled so that a block temperature overshoots a sample cooling target temperature by cooling the sample block to a lower temperature than the cooling target temperature. In this case, the "overshoot" temperature for a cooling process would be lower than the target cooling temperature, not higher than the target temperature as in a heating process.

EXAMPLE

An embodiment of the invention ("invention mode") was tested against the conventional "feedback" type of thermal cycler ("calc mode"), and a "block mode" type thermal cycler. The test was designed as a quick first pass with a qPCR reaction using an algorithm that used to above-described overshoot method.

The instrument used as a Mini-Opticon #1105 with normal production software and firmware, or with the programming as described above. The Mini-Opticon thermal cycler is commercially available from the assignee of the present invention.

The reagents used were included Bio-Rad Supermix+SG1; GC64-2 primers; lambda DNA target at 5000/μl; and 20 μl reactions. These reagents are commercially available from the assignee of the present invention.

The test involved a robust PCR reaction "GC64-2" which can be run according to the following protocol:
1. heat to 98° C., for 30 seconds;
2. cool to 92° C. for 1 second;
3. cool to 70° C. for 15 seconds;
4. read, and repeat steps 2 and 3 thirty-five times;
5. heat to 72° C. for 5 minutes; and
6. perform a melt profile process, heating in 0.2° C. steps, and 5 second holds, from 72 to 96° C.

Reactions were run in 8 wells in the sample block: A1, A6, C3, C4, F3, F4, H1, H6. This was to be sure that it was possible to see any subtle effects of block corners (traditionally a bit cooler) and the block centers during the experiments. No such effects were seen.

If the invention mode was working properly, the PCR reactions would proceed and DNA would "grow". If the invention mode was not working properly, the block may reach the target temperature, but the samples will not reach the temperature and nothing will "grow".

Figure 10A:
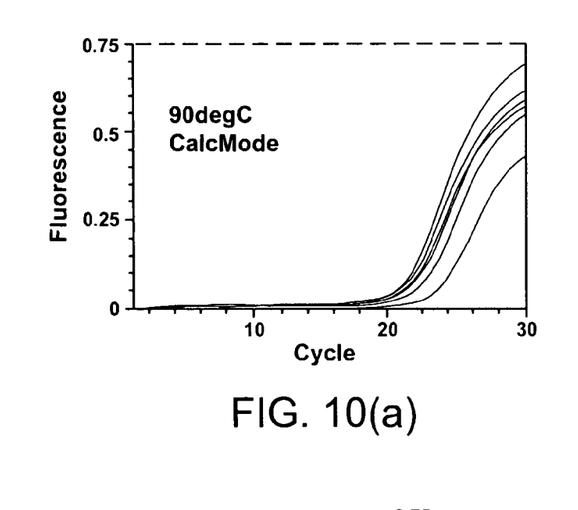
FIGS. 10(a), 10(b), and 10(c) show respectively, three graphs for experiments conducted in "calc mode", "block mode", and "invention mode".
Figure 10B:
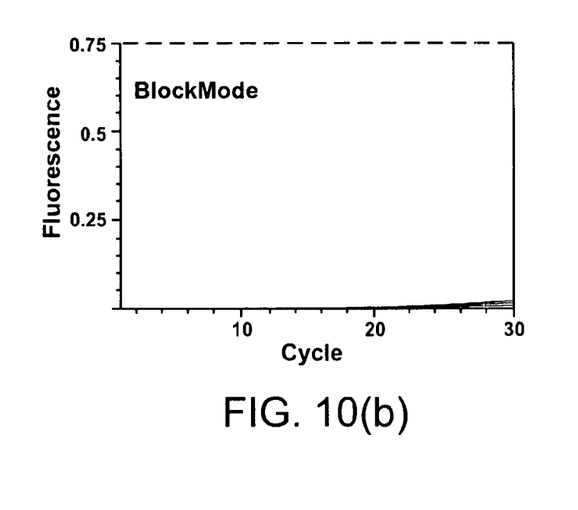
Figure 10C:
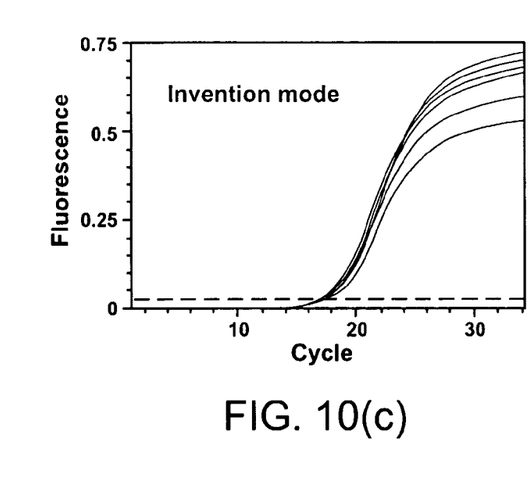

The results of the experiment were as follows. The PCR reactions worked equivalently in the calc mode and in the invention mode (See FIGS. 10(a) and 10(c)). Fluorescent signals from fluorescent tags on the formed DNA indicated the formation of such DNA. The reactions were equivalent both in the C(t) values (a measure of reaction efficiency) and in final amount of product made. The data in FIG. 10(c), which corresponds to the invention mode, was slightly better than the data in FIG. 10(a), which corresponded to the conventional calc mode. The data from the block mode, which is shown in FIG. 10(b), shows that the reactions did not proceed. FIGS. 10(a) and 10(c) thus show that embodiments of the invention work the same as or better than conventional feedback type thermal cyclers, while using less complicated software to achieve favorable results.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Also, it should be understood that embodiments of the present invention as described above can be implemented in the form of control logic using computer software in a modular or integrated manner. Also, embodiments of the invention include computer media including computer code for performing any of the above-described functions or calculations. Based on the disclosure and teachings provided herein, a person of ordinary skill in the art will know and appreciate other ways and/or methods to implement the present invention using hardware and a combination of hardware and software.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
identifying a desired temperature path of a sample temperature of a sample as a function of time, wherein the sample temperature changes from a first temperature at a time $t_0$ to a target temperature at a time $t_2$ along the desired temperature path during a first time interval from $t_0$ to $t_2$;
determining, with a computer, an additional amount of energy $A_b$ needed to have the sample temperature of the sample reach the target temperature at the time $t_2$, wherein determining $A_b$ includes:
determining a first area that is between the desired temperature path and a second temperature path over the first time interval from $t_0$ to $t_2$ and between the target temperature and the second temperature path over a second time interval from $t_2$ to $t_1$, wherein the sample temperature of the sample follows the second temperature path from the first temperature to the target temperature during a third time interval from $t_0$ to $t_1$ when a temperature changing element that changes the sample temperature is constant at the target temperature during the third time interval, wherein $t_2$ is less than $t_1$; and
storing data associated with the additional amount of energy $A_b$ and adapted to be used in a controlling of the temperature of the temperature changing element, the data specifying a second area between a third temperature path of the temperature changing element and the target temperature during the first time interval, the second area equal to the first area, wherein the third temperature path of the temperature changing element is adapted to have the sample temperature of the sample reach the target temperature at $t_2$, the third temperature path of the temperature changing element exceeding the target temperature for at least a portion of the first time interval and being at the target temperature at $t_2$.

2. The method of claim 1 wherein the temperature changing element includes a block and a heating element and wherein changing the sample temperature of the sample comprises heating the sample with the heating element.

3. The method of claim 1, wherein the sample is a first sample, wherein the temperature changing element includes a block and a heating element, and wherein the method further comprises:
heating a second sample using the heating element according to the data associated with the additional amount of energy $A_b$, wherein a time that is needed to heat the second sample to the target temperature from the first temperature is the first time interval.

4. The method of claim 3 wherein heating the second sample to the target temperature comprises:
prior to $t_2$, heating the heating element to a temperature that is higher than the target temperature; and
subsequently, reducing the temperature of the heating element so that the temperature of the heating element decreases to the target temperature at the time $t_2$.

5. The method of claim 4, wherein heating the second sample using the data associated with the additional amount of energy $A_b$ includes:
obtaining the energy $A_b$; and
controlling the temperature of the block such that an area under the block temperature and above the target temperature during the first time interval equals the energy $A_b$.

6. The method of claim 5, wherein the area forms a triangle.

7. The method of claim 1 wherein the sample is a first sample, wherein the temperature changing element includes a block and a cooling element, and wherein the method further comprises:
cooling a second sample using the cooling element according to the data associated with the amount of energy, wherein a time that is needed to cool the second sample to the target temperature from the first temperature is the first time interval.

8. The method of claim 7 wherein the cooling the second sample to the target temperature comprises:
prior to $t_2$, cooling the block to a temperature that is lower than the target temperature; and
subsequently, increasing the temperature of the cooling element so that the temperature of the cooling element increases to the target temperature at the time $t_2$.

9. The method of claim 1 wherein the sample comprises a biological material.

10. The method of claim 1 wherein the sample comprises a nucleic acid.

11. The method of claim 1, wherein determining the additional amount of energy $A_b$ comprises calculating an area underneath the desired temperature path and the target temperature and above the second temperature path over the time $t_1$.

12. The method of claim 1, wherein the temperature of the temperature changing element reaches the target temperature at the time $t_0$ when starting at an initial temperature at a time $t_i$.

13. The method of claim 1, wherein identifying a desired temperature path comprises determining a maximum rate at which the sample temperature of the sample changes in response to the temperature changing element.

14. The method of claim 13, wherein the data associated with the energy $A_b$ includes the maximum rate, the time $t_1$, and a value corresponding to an integration of the sample temperature during the third time interval.

15. The method of claim 1, wherein the data includes the energy $A_b$.

16. A computer readable medium comprising code for instructing a computer to perform a sequence of operations, the code including:
code for identifying a desired temperature path of a sample temperature of a sample as a function of time, wherein the sample temperature changes from a first temperature at a time $t_0$ to a target temperature at a time $t_2$ along the desired temperature path during a first time interval from $t_0$ to $t_2$;
code for determining, with a computer, an additional amount of energy $A_b$ needed to have the sample temperature of the sample reach the target temperature at the time $t_2$, wherein determining $A_b$ includes:
determining a first area that is between the desired temperature path and a second temperature path over the first time interval from $t_0$ to $t_2$ and between the target temperature and the second temperature path over a second time interval from $t_2$ to $t_1$, wherein the sample temperature of the sample follows the second temperature path from the first temperature to the target temperature during a third time interval from $t_0$ to $t_1$ when a temperature changing element that changes the sample temperature is constant at the target temperature during the third time interval, wherein $t_2$ is less than $t_1$; and
code for storing data associated with the additional amount of energy $A_b$ and adapted to be used in a controlling of the temperature of the temperature changing element, the data specifying a second area between a third temperature path of the temperature changing element and the target temperature during the first time interval, the second area equal to the first area, wherein the third temperature path of the temperature changing element is adapted to have the sample temperature of the sample reach the target temperature at $t_2$, the third temperature path of the temperature changing element exceeding the target temperature for at least a portion of the first time interval.

17. The computer readable medium of claim 16 wherein the sample is a first sample, wherein the temperature changing element includes a block and a heating element, and wherein the computer readable medium further comprises:
code for causing a heating element to heat a second sample using the data associated with the amount of energy, wherein a time that is needed to heat the second sample to the target temperature from the first temperature is the first time interval.

18. A method comprising:
retrieving stored data associated with an amount of energy $A_b$, the data specifying a first area;
changing the temperature of a temperature changing element using the data associated with the amount of energy $A_b$, wherein the temperature changing element is adapted to change the temperature of a sample from an initial temperature to the target temperature at a time $t_2$, wherein the temperature changing element reaches the target temperature at a time $t_0$ that is less than $t_2$; and
controlling the temperature of the temperature changing element such that a second area between a temperature path of the temperature changing element and the target temperature during a time interval from $t_0$ to $t_2$ equals the first area, the temperature path of the temperature changing element exceeding the target temperature for at least a portion of the time interval and being at the target temperature at the time $t_2$.

19. The method of claim 18 wherein the temperature changing element includes a block and a heating element, and wherein changing the temperature of the block and the heating element includes:

heating the block and heating element to a temperature that is higher than the target temperature; and subsequently, reducing the temperature of the heating element so that the temperature of the heating element decreases to the target temperature at the time $t_2$.

20. The method of claim 18 wherein the temperature changing element includes a cooling element, and wherein changing the temperature of the cooling element includes:

cooling the cooling element to a temperature that is below the target temperature; and subsequently, increasing the temperature of the cooling element so that the temperature of the cooling element increases to the target temperature at the time $t_2$.

21. The method of claim 18, wherein $t_2$ is less than a time $t_1$ that is required to change the temperature of the sample when the temperature changing element stays constant at the target temperature during a time interval from $t_0$ to $t_1$.

22. The method of claim 21, wherein the data associated with an amount of energy $A_b$ includes:

an energy A1 that is used to change the temperature of the sample to the target temperature when the temperature of the changing element stays at the target temperature during the time interval from $t_0$ to $t_1$, and a rate of temperature change of the sample on the temperature path when the sample reaches the target temperature at the time $t_2$, wherein the energy A1 and the rate are capable of being used to determine the first area.

23. A computer readable medium comprising code for instructing a processor to perform a sequence of operations, the code including:

code for retrieving stored data associated with an amount of energy $A_b$, the data specifying a first area;

code for changing the temperature of a temperature changing element using the data associated with the amount of energy $A_b$, wherein the temperature changing element is adapted to change the temperature of a sample from an initial temperature to the target temperature at a time $t_2$, wherein the temperature changing element reaches the target temperature at a time $t_0$ that is less than $t_2$; and code for controlling the temperature of the temperature changing element such that a second area between a temperature path of the temperature changing element and the target temperature during a time interval from $t_0$ to $t_2$ equals the first area, the temperature path of the temperature changing element exceeding the target temperature for at least a portion of the time interval and being at the target temperature at $t_2$.

24. The computer readable medium of claim 23 wherein the temperature changing element includes a block and a heating element and wherein the computer readable medium further comprises:

code for changing the temperature of the block and the heating element to a temperature that is higher than the target temperature; and code for subsequently reducing the temperature of the heating element so that the temperature of the heating element decreases to the target temperature at the time $t_2$.

25. The computer readable medium of claim 23 wherein the temperature changing element includes a block and a cooling element and wherein the computer readable medium further comprises:

code for changing the temperature of the block and the cooling element to a temperature that is lower than the target temperature; and code for subsequently increasing the temperature of the cooling element so that the temperature of the cooling element increases to the target temperature at the time $t_2$.

26. An apparatus comprising:

the computer readable medium of claim 23;

a processor operatively coupled to the computer readable medium; and the temperature changing element operatively coupled to the processor.

27. The apparatus of claim 26 wherein the apparatus is a thermal cycler.

28. The apparatus of claim 26 wherein the apparatus is adapted to heat and cool biological samples.

* * * * *